United States Patent
Chen et al.

(10) Patent No.: US 7,204,469 B2
(45) Date of Patent: Apr. 17, 2007

(54) MOUNTING APPARATUS FOR SECURING STORAGE DEVICE

(75) Inventors: Yun-Lung Chen, Tu-Cheng (TW); Wu Long, Shenzhen (CN); Ming-Xian Sun, Shenzhen (CN); Gang Su, Shenzhen (CN)

(73) Assignees: Hong Fu Jin Precision Industry (Shenzhen) Co., Ltd., Shenzhen, Guangdong (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 81 days.

(21) Appl. No.: 11/187,263

(22) Filed: Jul. 21, 2005

(65) Prior Publication Data

US 2006/0169867 A1 Aug. 3, 2006

(30) Foreign Application Priority Data

Dec. 24, 2004 (CN) .................... 2004 2 0103474

(51) Int. Cl.
*F16M 11/00* (2006.01)
(52) U.S. Cl. ...................... 248/694; 361/685
(58) Field of Classification Search ............. 248/694, 248/200; 361/685, 97.01, 724; 312/223.1
See application file for complete search history.

(56) References Cited

U.S. PATENT DOCUMENTS

| 4,979,909 | A | 12/1990 | Andrews |
| 6,498,723 | B1 * | 12/2002 | Konshak et al. ............ 361/685 |
| 6,625,014 | B1 | 9/2003 | Tucker et al. |
| 6,885,551 | B2 * | 4/2005 | Chen ........................... 361/685 |
| 2003/0052248 | A1 * | 3/2003 | Imamura .................... 248/694 |

\* cited by examiner

*Primary Examiner*—Ramon O Ramirez
(74) *Attorney, Agent, or Firm*—Morris Manning & Martin LLP; Tim Tingkang Xia, Esq.

(57) ABSTRACT

A mounting apparatus for securing a storage device (70) with a mounting slot (72) defined therein includes a bracket (30) for accommodating the storage device and a mounting member (50) pivotally attached to the bracket. A through opening (41) is defined in the bracket. A locating clip (46) extends from the bracket. A positioning block (59) protrudes from the mounting member corresponding to the through opening of the bracket. A latching finger (62) is formed at the mounting member for engaging with the locating clip. When the mounting member is rotated to engage the latching finger with the locating clip of the bracket, the positioning block inserts through the through opening of the bracket and engages in the mounting slot of the storage device.

18 Claims, 4 Drawing Sheets

MOUNTING APPARATUS FOR SECURING STORAGE DEVICE

BACKGROUND OF THE INVENTION

1. Field of the Invention

The present invention relates to mounting apparatuses, and more particularly to a mounting apparatus for conveniently securing a storage device into a computer enclosure and later removing therefrom.

2. General Background

Usually, a storage device, such as hard disk, is simply screwed to a bracket of a computer enclosure. This conventional mounting means substantially wastes the time, and thus adds the complexity and difficulty of assembling the storage device to the computer enclosure and later disassembling therefrom.

An anchoring apparatus for computer drives without using screws includes an anchor plate coupling on two struts located on an installation rack of the drives. The anchor plate pivotally and respectively engages with an actuating member on the left side and the right side through stub posts. The anchor plate has anchor stubs corresponding to anchor holes of the installation rack. Each strut is coupled with a returning spring. The actuating member has a driving lever on an outer side and an inner side extended to form a driven end. The driving lever may be moved to a returning position thereby to replace and install the drive without disassembling screws. However, so many elements are needed in the anchoring apparatus described above that will increase manufacturing cost and assembly time.

What is needed, therefore, is a mounting apparatus for conveniently securing a storage device to a bracket of a computer enclosure and having a simple structure.

SUMMARY

A mounting apparatus for securing a storage device with a mounting slot defined therein includes a bracket for accommodating the storage device and a mounting member pivotally attached to the bracket. A through opening is defined in the bracket. A locating clip extends from the bracket. A positioning block protrudes from the mounting member corresponding to the through opening of the bracket. A latching finger is formed at the mounting member for engaging with the locating clip. When the mounting member is rotated to engage the latching finger with the locating clip of the bracket, the positioning block inserts through the through opening of the bracket for and engages in the mounting slot of the storage device.

Advantages and novel features of the present invention will be drawn from the following detailed description of preferred embodiment with attached drawings, in which:

DETAIL DESCRIPTION OF PREFERRED EMBODIMENT

Figure 1:
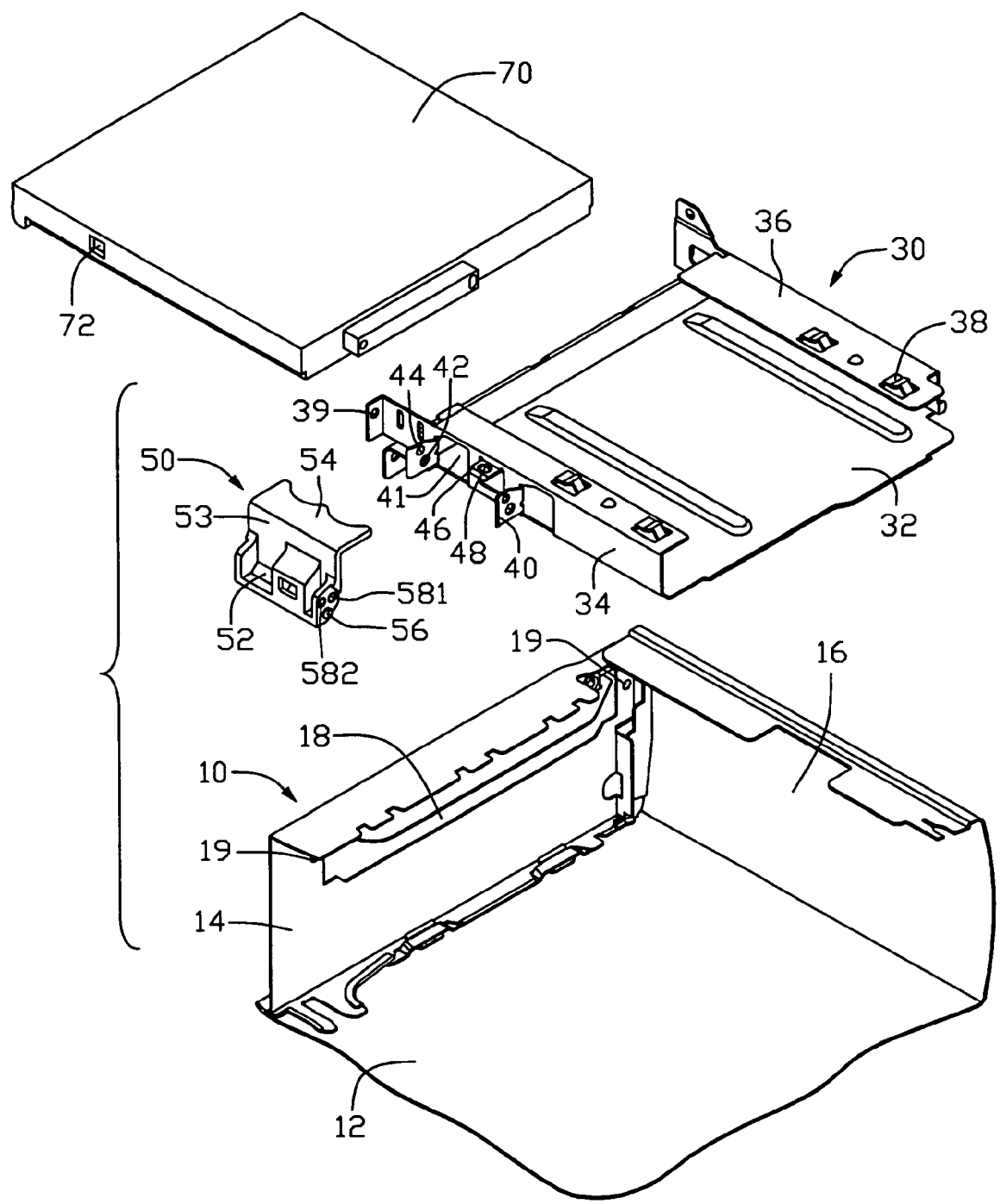
FIG. 1 is an exploded, isometric view of a mounting apparatus, a storage device and a computer enclosure of a preferred embodiment of the present invention, the mounting apparatus including a bracket and a mounting member.

Referring to FIG. 1, a computer enclosure 10 includes a bottom panel 12, a front panel 14 and a side panel 16 perpendicularly extending from adjacent edges of the bottom panel 12. A rectangular opening 18 is defined in the front panel 14. Two mounting holes 19 are defined in both sides of the opening 18 respectively.

A bracket 30 is mounted in the computer enclosure 10 for accommodating a storage device 70 with a mounting slot 72 in a side wall. The bracket 30 includes a bottom plate 32 and a pair of side plates 34 perpendicularly extending from opposite edges of the bottom plate 32. A pair of top plates 36 extends inward from top edges of the side plates 34 in a horizontal direction. A plurality of resilient clips 38 is formed on the top plates 36 for preventing Electronic Magnetic Interference. A pair of bent portions (not labeled) extends outward from front ends of the side plates 34 respectively. Each of the bent portions defines a screw hole 39 therein corresponding to the mounting hole 19 of the computer enclosure 10. A pair of retaining clips 40 protrudes from a front portion of one of the side plates 34 by stamping. A pair of through opening 41 is thus defined in the side plate 34 adjacent to the retaining clip 40. A pivot hole 42 is defined in each of the retaining clip 40. A protuberance 44 protrudes from each of the retaining clip 40. A locating clip 46 extends outward from the side plate 34 between and perpendicular to the retaining clips 40. A through hole 48 is defined in the locating clip 46.

Figure 2:
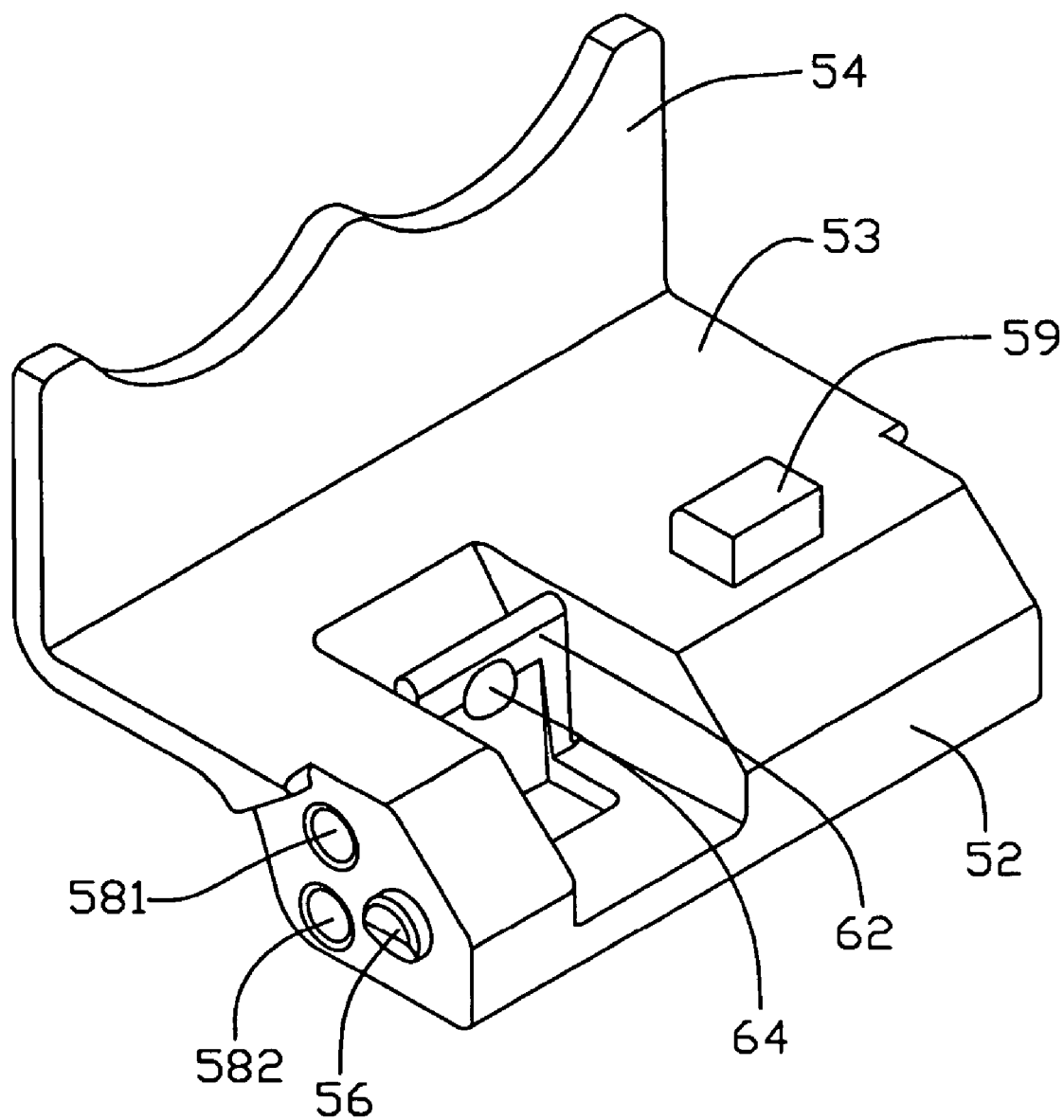
FIG. 2 is another isometric view of the mounting member.

Referring also to FIG. 2, a mounting member 50 pivotally attached to the side plate 34 of the bracket 30 includes a main body 52 and a flat portion 53 extending from the main body 52. An operating portion 54 extends perpendicularly from an outer edge of the flat portion 53. A pair of pivot posts 56 is formed at opposite faces of the main body 52, in a direction parallel to the bottom plate 32 of the bracket 30, corresponding to the pivot holes 42 of the retaining clips 40. First and second recesses 581, 582 are defined in the side faces of the main body 52. A positioning block 59 protrudes from the flat portion 53 for engaging in the mounting slot 72 of the storage device 70. A groove (not labeled) is defined in the main portion 52 beside the positioning block 59. A latching finger 62 is formed in the groove. A fastening protrusion 64 is located on the latching finger 62 for engaging in the through hole 48 of the locating clip 46 of the bracket 30.

Figure 3:
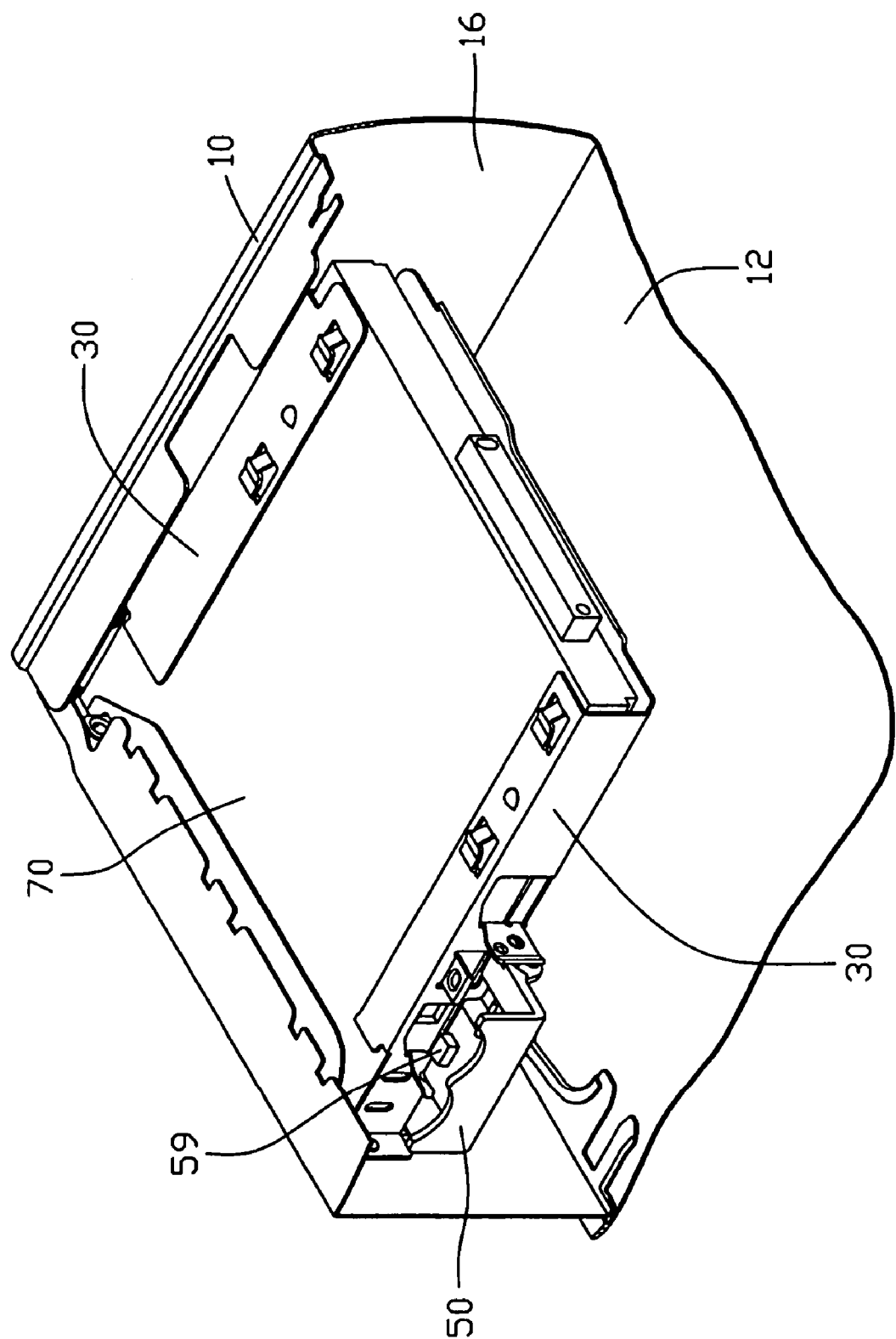
FIG. 3 is an assembled view of FIG. 1, and showing the mounting member in a unlocked position.

Referring also to FIG. 3, the bracket 30 is mounted in the computer enclosure with fasteners, such as screws screwed into the mounting holes 19 of the front panel 14 and the screw holes 39 of the bracket 30. The pivot posts 56 of the mounting member 50 insert into the pivot holes 42 of the retaining clips 40. The mounting member 50 is thus pivotally attached to the retaining clips 40 of the side plate 34 of the bracket 30. The protuberance 44 snaps into the first recess 581 of the mounting member 50. The mounting member 50 is in a unlocked position.

The storage device 70 slides into the bracket 30 from the opening 18 of the front panel 14 of the computer enclosure 10. When the mounting slot 72 of the storage device 70 aligns with the through opening 41 adjacent to the front panel 14, the mounting member 50 is rotated towards the side plate 34 of the bracket 30 with the operating portion 54. The protuberances 44 of the retaining clips 40 are disengaged from the first recess 581 of the mounting member 50 and snap into the second recess 582. The fastening protrusion 64 of the latching finger 62 engages in the through hole

48 of the locating clip 44 of the side plate 34. The positioning block 59 inserts through the through opening 41 of the side plate 34, and engages in the mounting slot 72 of storage device 70. The mounting member 50 is in a locked position. The storage device 70 is thus mounted into bracket 30.

Figure 4:
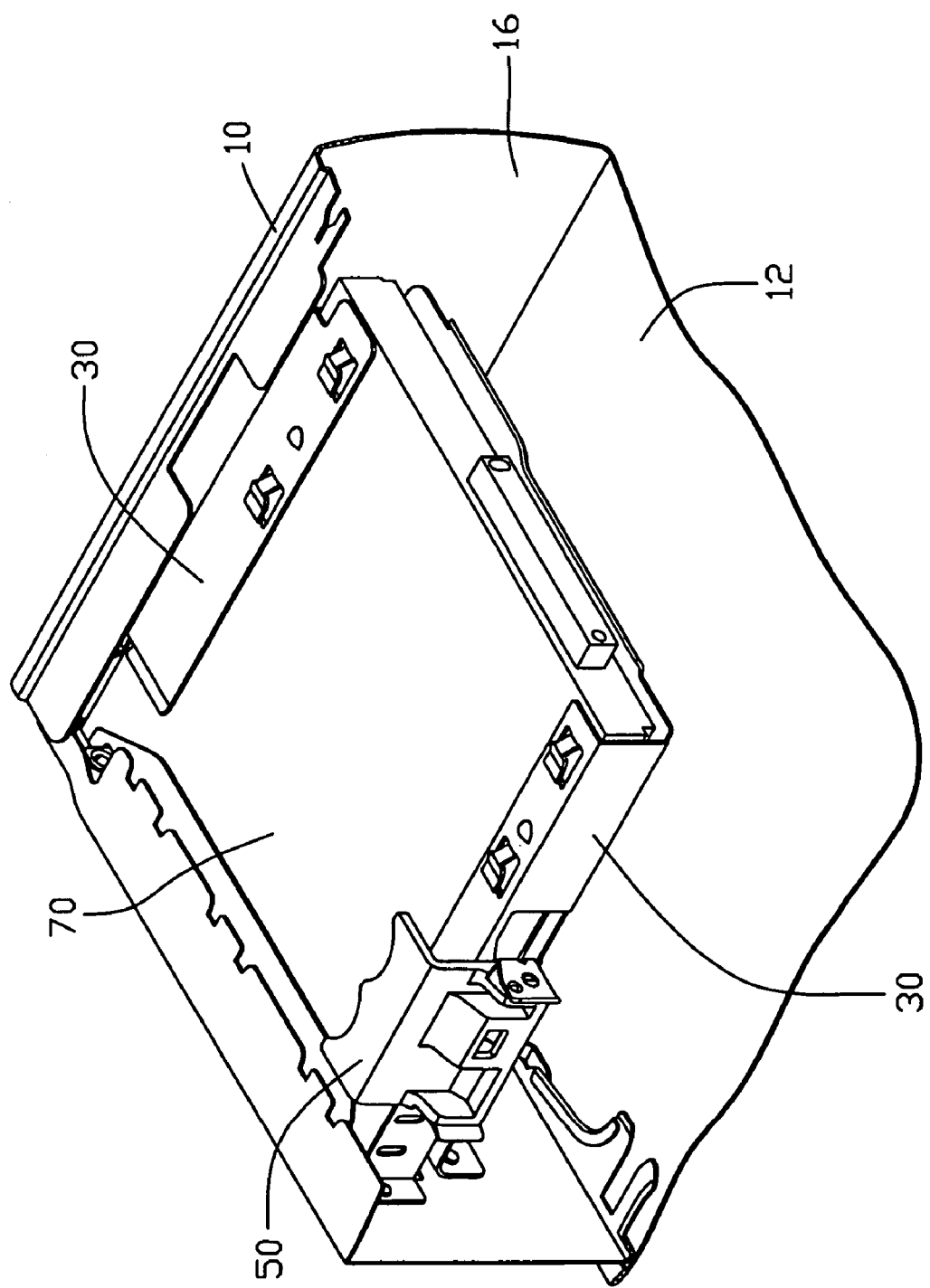
FIG. 4 is similar to FIG. 3, but showing the mounting member in a locked position.

Referring also to FIG. 4, in disassembling the storage device 70, the mounting member 50 is rotated from the locked position to the unlocked position by pushing the operating portion 54 reversely. The fastening protrusion 64 of the latching finger 62 disengages from the through hole 48 of the locating member 46. The protuberances 44 disengage from the second recess 582 and engage in the first recess 581 again. The positioning block 59 is drawn out of the mounting slot 72 of the storage device 70. The storage device 70 can be thus removed from the bracket 30.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A mounting apparatus for securing a storage device with a mounting slot defined therein, comprising:
    a bracket for accommodating the storage device, a through opening being defined therein, a locating clip extending therefrom; and
    a mounting member pivotally attached to the bracket, a positioning block protruding from the mounting member corresponding to the through opening of the bracket, a latching finger being formed at the mounting member for engaging with the locating clip; whereby
    when the mounting member is rotated to engage the latching finger with the locating clip of the bracket, the positioning block inserts through the through opening of the bracket and engages in the mounting slot of the storage device.

2. The mounting apparatus as described in claim 1, wherein a through hole is defined in the locating clip, and a fastening protrusion is formed at the latching finger for engaging in the through hole.

3. The mounting apparatus as described in claim 1, wherein the bracket comprises a side plate with a retaining clip extending therefrom for the mounting member attached thereto.

4. The mounting apparatus as described in claim 3, wherein a protuberance protrudes from the retaining clip, and a recess is defined in the mounting member corresponding to the protuberance.

5. The mounting apparatus as described in claim 3, wherein the bracket further comprises a bottom plate perpendicular to the side plate, and a pair of pivot posts extends from opposite faces of the mounting member in a direction parallel to the bottom plate.

6. A storage device assembly comprising:
    a storage device defining a mounting slot aside;
    a bracket for accommodating the storage device therein and allowing the storage device movable in and out, the bracket defining a through opening at a side thereof corresponding to the mounting slot of the storage device and capable of aligning with the mounting slot when the storage device moves to an accommodated position thereof in the bracket; and
    a mounting member pivotally attached to the bracket beside the through opening thereof, a positioning block protruding from the mounting member corresponding to the through opening of the bracket, the mounting member being pivotally movable from a first position thereof where the mounting member abuts against the bracket to allow the positioning block engagable with the mounting slot via the through opening in order for retaining the storage device in the accommodated position thereof, and a second position thereof where the mounting member is mainly situated perpendicular to the side of the bracket away from the through opening thereof.

7. The assembly as described in claim 6, wherein a retaining clip extends from the bracket and has a protuberance formed thereon, and the mounting member has a recess corresponding to the protuberance of the retaining clip, engagement of the protuberance and the recess is capable of retaining the mounting member in the first position thereof.

8. The assembly as described in claim 7, wherein the mounting member further has a second recess for engaging with the protuberance of the retaining clip to retain the mounting member in the second position.

9. The assembly as described in claim 6, wherein the bracket comprises a bottom plate, and a pair of pivot posts extends from opposite faces of the mounting member in a direction parallel to the bottom plate.

10. The assembly as described in claim 6, wherein a locating clip extends from the bracket for engaging with the mounting member.

11. The assembly as described in claim 10, wherein a latching finger is formed at the mounting member for engaging with the locating clip.

12. The assembly as described in claim 11, wherein a through hole is defined in the locating clip, and a fastening protrusion is formed at the latching finger for engaging in the through hole.

13. A storage device assembly comprising:
    a storage device defining a mounting slot therein;
    a bracket for accommodating the storage device, the bracket comprising a side plate, a through opening being defined in the side plate corresponding to the mounting slot of the storage device;
    a mounting member pivotally attached to the bracket, a positioning block protruding from the mounting member and engaging into the mounting slot through the through opening of the bracket; and
    a securing means for preventing the mounting member being rotated to disengage the positioning block from the mounting slot of the storage device.

14. The assembly as described in claim 13, wherein the bracket further comprises a bottom plate perpendicular to the side plate, and a pair of pivot posts extends from opposite faces of the mounting member in a direction parallel to the bottom plate.

15. The assembly as described in claim 13, wherein a pair of retaining clips extends from the side plate for the mounting member pivotally attached thereto.

16. The assembly as described in claim 15, wherein the securing means comprises a protuberance formed at the retaining clip and a recess defined in the mounting member corresponding to the protuberance.

17. The assembly as described in claim 13, wherein the securing means comprises a locating clip extending from the side plate and a latching finger formed at the mounting member for engaging with the locating clip.

18. The assembly as described in claim 17, wherein a through hole is defined in the locating clip, and a fastening protrusion is formed at the latching finger for engaging in the through hole.

* * * * *